United States Patent [19]
Tauber

[11] Patent Number: 5,650,014
[45] Date of Patent: Jul. 22, 1997

[54] SUGAR ADDITIVE TO REDUCE CAKING

[76] Inventor: Julius Tauber, 1669 50th St., Brooklyn, N.Y. 11204

[21] Appl. No.: 426,032

[22] Filed: Apr. 21, 1995

[51] Int. Cl.⁶ .............. C08B 30/00; C13F 3/00; A23B 4/03; A23G 3/00
[52] U.S. Cl. .............. 127/29; 426/442; 426/443; 426/658
[58] Field of Search .............. 127/29; 252/381, 252/384; 426/442, 443, 658

[56] References Cited

U.S. PATENT DOCUMENTS

| | | | |
|---|---|---|---|
| 3,051,550 | 8/1962 | Speed | 23/110 |
| 4,752,465 | 6/1988 | Mackles | 424/45 |
| 4,818,292 | 4/1989 | Iley et al. | 106/210 |
| 4,882,324 | 11/1989 | Wright et al. | 514/191 |
| 4,889,709 | 12/1989 | Mackles et al. | 424/45 |

FOREIGN PATENT DOCUMENTS 215637  3/1987  European Pat. Off. ........ C11D 11/02

*Primary Examiner*—Glenn A. Caldarola
*Assistant Examiner*—Patricia L. Hailey
*Attorney, Agent, or Firm*—Darby & Darby

[57] ABSTRACT

The subject invention relates to a composition of sugar and an aluminosilicate salt. The aluminosilicate salt reduces the caking of the sugar.

14 Claims, No Drawings

SUGAR ADDITIVE TO REDUCE CAKING

FIELD OF THE INVENTION

The subject invention relates to a composition of sugar and an aluminosilicate salt. The aluminosilicate salt will reduce the caking of the sugar.

BACKGROUND OF THE INVENTION

Sugar is a large volume commodity product. It is used daily as a sweetening agent in a wide variety of foods. In the drug industry, it is used as an excipient or a coating for tablets.

A high percentage of the sugar used is in the form of granules (e.g., table sugar). In addition, a large amount of sugar is used in the form of powder, often referred to as confectioner's sugar. Sugar in this form is easy to use for baking or in commercial kitchens because it can be easily dissolved or dispersed in the materials used for baking, cooking, decorating, etc.

A specific problem which occurs with sugar, in particular, sugar in powdered form, is the tendency to cake or clump, forming small lumps, or a large solid or semi-solid block. One method for reducing the tendency of the sugar to cake is to add a small amount of corn starch to the sugar prior to packing and shipping. However, this is not acceptable in all cases because corn starch is not kosher for passover and use of this material is not acceptable to some people.

An object of the invention is to provide a sugar composition which is free of corn starch which does not exhibit caking problems.

SUMMARY OF THE INVENTION

The subject invention provides a composition comprising sugar and a metal salt of an aluminosilicate. The aluminosilicate salt reduces the caking of the sugar, but does not otherwise affect its taste or use.

The subject invention also contemplates a process for preparing a sugar composition which will be resistant to caking.

The compositions of the invention can employ sugar in either the powdered form (confectioner's sugar) or in crystalline form (table sugar). The preferred sugar is the powdered form.

The aluminosilicate salts are typically metal oxides of aluminum silicate with metal oxides. These materials are mined from naturally occurring materials or can be produced synthetically.

The aluminosilicate salts have the general formula:

$$[M(AlO_2)(SiO_2)]_x$$

wherein M is a metal and x is from 1 to about 12. The preferred metals are the alkali metals or the alkaline earth metals. Examples of the alkali metals useful in practicing the subject invention are sodium, potassium, and the like. Examples of the alkaline earth metals useful in practicing the subject invention are magnesium, calcium and the like. The preferred salts are sodium aluminosilicate or magnesium aluminosilicate. The most preferred salt is sodium aluminosilicate (available from J. M. Huber Corp., Havre DeGrace, Md.).

The amount of aluminosilicate salt required for use in the subject invention is from about 0.75 weight percent to about 1.5 weight percent, based on the total amount of sugar. The preferred amount of aluminosilicate salt is about 1 weight percent.

Sugar is typically obtained from sugar cane or sugar beets by extraction with water. The sugar is then purified by crystallization. Powdered sugar is usually prepared by pulverizing with a hammermill. However, any equipment suitable for pulverizing can be used to prepare the sugar.

EXAMPLES

The invention will now be illustrated in the following non-limiting example which is illustrative of the invention but is not intended to limit the scope of the invention.

Example 1

Powdered sugar, 100 lbs., was mixed with sodium aluminosilicate salt, 1 lb., in a commercial blender. Samples of the sugar/aluminosilicate salt blend were allowed to stand in both open and closed containers. The sugar mixture was examined daily for a period of three months. The sugar/aluminosilicate salt mixture flowed readily with no signs of caking or the formation of lumps.

Comparative Example 1

Powdered sugar without any additive was allowed to stand in open and closed containers. The sugar was checked periodically for lumps and clumping. After about 7 days clumping began and lumps were formed.

Comparative Example 2

A commercially available powdered sugar/starch composition was obtained and examined. The composition was found to have clumps (which could be broken up) and small lumps.

As illustrated by the Examples presented herein the composition with the aluminosilicate salt exhibited superior anti-caking properties.

The Federal Food and Drug Administration has determined that aluminosilicate salts, in the amounts recommended herein, are suitable for human consumption.

The invention has been described above by reference to preferred embodiments but, as those skilled in the art will appreciate, many additions, omissions and modifications are possible all within the scope of the claims below.

I claim:

1. An edible composition consisting essentially of sugar and a metal salt of an aluminosilicate wherein said composition is a non-caking, free-flowing crystalline or powdered material and wherein the amount of aluminosilicate salt is from about 0.75 weight percent to about 1.5 weight percent based on the total amount of sugar.

2. The composition according to claim 1 wherein the sugar is one of a powder and crystalline form.

3. The composition according to claim 2 wherein the sugar is a powder.

4. The composition according to claim 1 wherein the metal portion of the metal salt is selected from the group consisting of sodium, potassium, magnesium and calcium.

5. The composition according to claim 4 wherein the salt is sodium aluminosilicate.

6. The composition according to claim 4 wherein the salt is magnesium aluminosilicate.

7. The composition according to claim 1 wherein the amount of aluminosilicate salt is about 1 weight percent.

8. A process for preparing a sugar composition wherein said composition is resistant to caking;

said process comprising the step of blending sugar with a metal salt of an aluminosilicate, wherein the amount of aluminosilicate salt is from about 0.75 weight percent to about 1.5 weight percent based on the total amount of sugar.

9. The process according to claim 8 wherein the sugar is one of a powder and a crystalline form.

10. The process according to claim 9 wherein the sugar is a powder.

11. The process according to claim 8 wherein the metal portion of the metal salt is selected from the group consisting of sodium, potassium, magnesium and calcium.

12. The process according to claim 11 wherein the salt is sodium aluminosilicate.

13. The process according to claim 11 wherein the salt is magnesium aluminosilicate.

14. The process according to claim 8 wherein the amount of aluminosilicate salt is about 1 weight percent.

\* \* \* \* \*